3,541,011
LUBRICATING COMPOSITION

William J. Davis, Wyomissing, Richard C. Gilles, Sinking Spring, and Lawrence A. Miller, Reading, Pa., assignors to Joseph E. Ferri, Shillington, Pa.
No Drawing. Continuation-in-part of application Ser. No. 486,214, Sept. 9, 1965, which is a continuation-in-part of application Ser. No. 363,294, Apr. 28, 1964. This application Oct. 28, 1968, Ser. No. 771,348
Int. Cl. C10m 7/14
U.S. Cl. 252—12                    21 Claims

ABSTRACT OF THE DISCLOSURE

Lubricating composition containing a hydrocarbon oil, polyethylene having an average molecular weight within the range of from about one and one half million to about five million, and polyethylene having a molecular weight of up to and including one million.

---

This is a continuation-in-part of application Ser. No. 486,214, filed Sept. 9, 1965, (now abandoned) which in turn is a continuation-in-part of abandoned application Ser. No. 363,294, filed Apr. 28, 1964.

In a related application, namely Ser. No. 771,273, filed of even date herewith, there is described and claimed lubricating compositions containing a lubricant and polyethylene having an average molecular weight within the range of from over 1,000,000 to about 5,000,000. The invention described herein is related to modifications that can be made in properties of the aforementioned lubricating composition of said related application by adding thereto another polymeric component.

There is a great demand and a long-felt need in every industry for a lubricating product which, once used as a lubricating medium in an object, is lubricant-releasing and imparts a long-lasting self-lubricating quality to the object. For example, self-lubricating bearings are extremely useful in the automotive industry, the aviation industry, and almost anywhere bearings are used. If such lubricating product has a mechanical strength sufficient to be a part of the structure of the object for which it is a lubricant, then, not only the self-lubricating quality of the object is achieved, but the object also can be produced easily, economically and without the usual problems of manufacturing. Accordingly, an object of this invention is to fulfill the long-felt need for the lubricating product by providing a lubricating composition which is simple, economcal and easy to use.

Another object of this invention is to provide a lubricating composition the viscosity of which may be varied within a wide range.

Another object of this invention is to provide a lubricating composition comprising a lubricant and a high molecular weight polyethylene.

Another object of this invention is to provide a lubricating composition comprising a lubricant and different molecular weight polyethylenes which include a high molecular weight polyethylene, and the method of producing the same.

Another object of this invention is to provide a 'ubricating composition which has sufficient mechanical strength to form all or a portion of the structure of an object.

Another object of the present invention is to provide a lubricating material for an object to impart a long-lasting self-lubricating quality to the object.

Another object of this invention is to provide a lubricating composition that can be poured and set up in situ. These and other objects and advantages of this invention will become apparent and best understood from the following description and appended claims.

The term "self-lubricating" as used herein in connection with an object, such as a bearing, indicates that a continuous or periodical supply of a lubricant from an external source to the object is unnecessary. The percentages of different materials used herein are all based on the total weight of the composition of this invention. The terms "molecular weight" as used herein denotes average molecular weight. The terms "high molecular weight" as used herein denotes a molecular weight of from over $1.0 \times 10^6$ to about $5.0 \times 10^6$. The terms "lower molecular weight" as used herein denotes a molecular weight of 1,000,000 or less, for instance, between about 1,000 and 100,000.

As mentioned hereinabove, there is disclosed in application Ser. No. 771,273, filed of even date herewith a lubricating composition comprising a polyethylene having a high molecular weight, that is a molecular weight within the range of from over 1,000,000 to about 5,000,000 and a lubricant, such as a hydrocarbon oil. This composition, which can exist in various gel forms, is a long-lasting lubricating medium. The higher the molecular weight of the high molecular weight polyethylene and the higher the amount of high molecular weight polyethylene in the composition, the firmer and more viscous is the gel composition. Thus, depending upon the specific molecular weight of the high molecular weight polyethylene and/or the specific amount thereof in the composition, the physical characteristics of the composition vary and range from a thin, weak gel which behaves as a liquid to a firm, tough, rigid gel which looks like and functions as a solid. The intermediate composition between the weak gel and the rigid gel can be characterized as a jelly-like gel.

This present invention is directed to modifications in properties of the composition described and claimed in the above-mentioned copending application Ser. No. 771,273, by adding thereto another type of polyethylene. The composition of the present invention comprises a polyethylene having a molecular weight of 1,000,000 or less, that is a lower molecular weight polyethylene, in addition to a lubricant and a high molecular weight polyethylene, that is one having a molecular weight of from over $1 \times 10^6$ to about $5 \times 10^6$. Surprisingly, it has been found that the inclusion of a lower molecular polyethylene in a gel composition also comprising a lubricant and a high molecular weight polyethylene modifies the lubricant-releasing and lubricant-retaining characteristics of the gel. Such modification in the lubricating quality of the gel is especially advantageous when the composition is a firm, rigid gel and is to be used as a part of the structure of a self-lubricating object, for instance, a bearing. More specifically, the presence of the lower molecular weight polyethylene causes a slowdown in the rate at which the lubricant is dispensed from the composition. By varying the amount of lower molecular weight polyethylene in the composition, there can be made compositions which have different lubricant dispensing rates for particular applications.

Depending upon the specific molecular weight of the high molecular weight polyethylene and the specific amount thereof in the composition, the physical characteristics of the composition of the present invention range from a thin, weak gel which behaves as a liquid to a firm, tough, rigid gel which looks like and functions as a solid. The intermediate composition between the weak gel and the rigid gel can be characterized as a jelly-like gel.

In storage, the composition of the present invention has the capability of retaining the lubricant for as long as desired. Upon use as a lubricating medium for an object, such as a solid lubricant for a bearing, the composition is continuously and gradually lubricant-releasing for the life of the object and imparts a long-lasting, self-lubricating quality to the object. The firm, rigid gel can be, if desired, produced and adapted to function as a part of the structure of the object for which it is a lubricating medium. For instance, the lubricating composition may form the socket portion of a ball joint comprising a ball and a socket, and at the same time can lubricate the surface of the ball.

The amount of the high molecular weight polyethylene employed in the gel composition of this invention depends upon the desired viscosity, toughness, and strength of the composition. As stated hereinabove, the higher the amount of the high molecular weight polyethylene in the composition, the more viscous and stronger is the gel. For instance, the gel behaves as a liquid when up to about 1% of the high molecular weight polyethylene is used. The mere presence of the high molecular weight polyethylene in the oil has an influence on its properties. However, it is desirable that the liquid gel composition contain at least about 0.25% of the high molecular weight polyethylene in order to realize fully the benefits gained by adding it to the oil. The gel behaves as a gelatinous jelly-like composition when from greater than 1% to about 5% of the high molecular weight polyethylene is used. The gel is rigid and functions as a solid when from over 5% to about 90% or higher of the high molecular weight polyethylene is used to form the gel. It has been found that the structural strength of the rigid gel composition is excellent when the amount of high molecular weight polyethylene is within the range of about 25% to about 85%. Consequently, in applications where structural strength of the composition is important, it is preferred that the composition contain about 25–85% of high molecular weight polyethylene. In applications where structural strength of the rigid gel composition is not of primary importance, amounts of high molecular weight polyethylene within the range of about 8% to about 40% can be used advantageously.

The molecular weight of the lower molecular weight polyethylene employed in a gel composition is preferably much lower than that of the high molecular weight polyethylene, for example between about 1,000 to about 100,000.

Most preferably, the molecular weight of the lower molecular weight polyethylene is within the range of about 20,000 to about 50,000. Compositions containing polyethylene within this molecular weight range have been found to have very desirable oil-releasing characteristics for the various applications in which the compositions can be used.

The amount of the lower molecular weight polyethylene to be used to produce the thin, weak gel can vary; however, the preferred amount is within the range of about 0.25% to about 1%. It is also preferred that the total polyethylenes in the liquid gel composition be not more than about 1%. The amount of the lower molecular weight polyethylene in the jelly-like composition and the rigid gel composition can vary; however, it is preferred to use, respectively, about 0.25% to about 10%, and about 0.25% to about 40% of the lower molecular weight polyethylene. Most preferably, the jelly-like gel composition should contain about 1% to about 5% of the lower molecular weight polyethylene. Most preferably, the rigid gel should contain about 1% to about 15% of the lower molecular weight polyethylene.

The amount of the lubricant to produce the thin, weak gel, the jelly-like gel, and the rigid gel of this invention can vary over a wide range. However, it is preferred to employ: about 98% to about 99.5% oil for the liquid gel; about 89% to about 98.75% oil for the jelly-like gel; and about 9.75% to about 94.75% oil for the rigid gel.

The unique properties of the composition of this invention allow it to be prepared in a variety of ways, each of which has its particular advantages. In general, the process of producing the composition of this invention is simple and comprises admixing the high molecular weight polyethylene, the lower molecular weight polyethylene, each of which are preferably in powdered or flake form, with a lubricant, for example, a mineral oil, heating the mixture, with or without stirring or agitation, to a sufficient temperature high enough to cause melting or blending of the polymer components thereof and for a time sufficient to obtain a homogeneous mixture of the polyethylene components and lubricant. Upon cooling, the homogeneous mixture or mass forms the gel composition of this invention. The viscosity and strength of the composition depend, as described hereinabove, on the molecular weight of the high molecular weight polyethylene employed and the amount thereof.

The temperatures employed to heat a mixture of a high molecular weight polyethylene, a lower molecular weight polyethylene, and a lubricant in the method of this invention are sufficiently high to melt and cause mixing of the components of the mixture. In general, the heating temperatures employed range between about 240° F. and about 450° F.; however, the temperatures should not be high enough to cause thermal decomposition. When the mixture begins to form into a homogeneous mass, it will be observed that for a composition which contains about 5% or more high molecular weight polyethylene, there is obtained a thick, cohesive, but flowable, composition. On the other hand, when the high molecular weight polyethylene comprises less than about 5% of the composition, there is obtained a thin fluid mixture at the temperature of homogeneous mass formation.

After the components have blended into a homogeneous composition within the temperature range of about 240° F. to about 450° F., the composition should then be allowed to cool. When preparing the jelly-like and rigid gels, it will be observed that as the homogeneous mass is cooled, it will begin to take on the appearance of its final form at a temperature generally within the range of about 200° F. to about 300° F. This is the temperature transition range where the homogeneous mass begins to change from a flowable state to a solid jelly-like or rigid state.

During the heating of a mixture of the polyethylene components and lubricant, it is preferred to agitate the mixture to cause better mixing so that the polyethylene components do not settle out of the mixture. Any conventional method of producing the mixing, such as in an ordinary extruder or sigma mixer is satisfactory. A conventional laboratory propeller-type mixer can be used conveniently when preparing the fluid-like gels.

Another important advantage that is realized when the high and lower molecular weight polyethylene/lubricant mixture is agitated or mixed as it is being heated is that the overall time for preparing the gel composition can be shortened. In this connection it is noted that the time for preparing the composition will depend upon a number of variables, including the overall amount of the composition that is being prepared and the manner in which the components are mixed and heated during the preparation. By way of example, it can take from about 5 to about 10 minutes to prepare about 1,000 grams of the composition by hand mixing. Longer mixing and heating times may be required to prepare larger batches of the composition. On the other hand, large amounts of the composition can be prepared in less time if an extruder is used as the heating and agitating device. If the polymer/lubricant components are not agitated during the heating stage, it generally takes about 45 to about 60 minutes before the components blend into a homogeneous mass.

There are applications, however, where that characteristic of the composition of this invention which enables it to be prepared without stirring during the heating stage of preparation is extremely important. For eample, in many applications wherein it is expedient that the rigid gel composition be made by molding it in situ to form a self-lubricating object, for example by encapsulating multiple bearings in a housing, it is very difficult, if not impossible to stir and agitate the mixture due to the size or shape of that mold. Whereas heretofore known polymer/lubricant compositions which require stirring and agitation for preparation would hardly be suitable for such applications, the composition of this invention can be used very suitably and to good advantage. Thus, at the expense of a somewhat longer preparation time, the unique properties of the composition of this invention which allow it to be prepared by simply heating without stirring enable it to be used in applications where the use of known polymer/lubricant compositions would be attended by difficult problems. As will be shown in connection with the examples reported below, attempts to prepare lubricating compositions containing oil and a polyethylene of molecular weight lower than one million, by simply heating a mixture of the oil and polyethylene, have shown that the preparation of a homogeneous composition was attained only after heating the mixture for a much longer period of time than that needed to prepare the composition of this invention.

Another and preferred method of producing the rigid, tough gel composition of this invention comprises first preparing a homogeneous, fluid-like, thin, weak gel composition of the high molecular weight polyethylene, in accordance with the method of this invention described hereinabove, and then mixing lower molecular weight polyethylene and additional high molecular weight polyethylene with the weak gel composition to obtain a liquid dispersion mixture thereof. (This dispersion mixture is stable over a relatively long period of time, that is, the polyethylenes do not tend to settle out of the liquid dispersion mixture.) This dispersion mixture is heated with or without stirring to a temperature sufficient to melt the mixture, preferably between about 240° F. and about 450° F. The heated mixture forms the desired rigid composition upon cooling to a temperature sufficient to solidify it. This usually occurs at a temperature between about 200° F. and 300° F. The amount of the high molecular weight polyethylene dispersed in the weak gel composition should be sufficient to produce the desired rigidity and toughness for the final gel product. In any event, the total amount of high molecular weight polyethylene in the rigid gel should be the same as that described hereinabove for a rigid gel composition of this invention.

An advantage that is realized by preparing the rigid gel composition of this invention according to the preferred method set forth immediately above is that the above described stable dispersion mixture can be shipped in liquid form by a formulator to a manufacturer or processor who can then convert the liquid dispersion mixture, by heating and cooling as described, into a rigid self-lubricating object of any desired shape. It is noted that if an amount of high molecular polyethylene in excess of about 5% is combined with a lubricant and dispersed therein, it will be found that the polyethylene tends to settle out in a relatively short period of time, that is, it is not a stable dispersion as is the stable dispersion described above. As a consequence, one is confronted with handling problems when this type of dispersion is shipped from the formulator to the manufacturer or processor.

The rigid, tough gel composition of this invention can be easily adapted to be a part of the structure of a self-lubricating object, such as an antifriction bearing. In this manner, not only the rigid gel composition is a structural part of the object, such as the retainer and/or seal, but also it is continuously and gradually lubricant-releasing for the life of the object and imparts a long-lasting, self-lubricating quality to the object. For instance, to adapt the rigid composition to be a part of the structure of a bearing, a dispersion mixure of a weak gel composition of this invention, a lower molecular weight polyethylene and additional high molecular weight polyethylene is prepared as described above and used to fill the space between the inner and outer rings of the bearing, i.e., the space in which the rolling elements of a bearing are located. The bearing which is filled with the dispersion mixture is heated to a temperature between about 240° F. and about 450° F., which heating can be accomplished with or without stirring. The heated dispersion mixture in the bearing is then cooled to solidify the mixture, thereby forming a rigid, strong portion of the bearing. The rigid gel in the bearing tends to eliminate the need for a retainer and/or seal for the rolling elements and the oil which exudes from the gel lubricates the bearing. Such bearing can be used in any conventional manner, such as to support the shaft in an electric motor.

The composition has the capability of being poured and molded in situ for uses such as electrical insulation for cables and as an encapsulating material for electronic components. The product of this invention has high voltage breakdown and self-healing characteristics and with certain additives, such as boron, it is a shielding material for nuclear reactors. The composition of this invention can be used in other applications depending upon the physical properties and characteristics of the composition. For instance, the weak gel composition which behaves like a liquid is useful in the lubricating of gear trains or as a motor oil which substantially reduces the wear and tear of a motor. The gelatinous, jelly-like composition is useful in the lubrication of porous or non-porous sleeve, ball and roller bearings. Present methods for lubricating porous and non-porous sleeve bearings involve the use of a reservoir which holds a felt or fibrous material which is impregnated with oil which is fed by capillary action to the bearings. The composition of the present invention can be substituted for the oil impregnated felt or fibrous materials and will function to lubricate the bearings in a manner such that the disadvantages inherent in the use of felt and fibrous materials are avoided.

The rigid gel composition not only can be used in forming the self-lubricating bearing described above, but it can also be used in producing different articles, such as the socket of a ball joint. To form the socket by previous methods required high precision which makes those methods expensive. It has been found that an economical and easy method of producing the socket comprises filling a container with the dispersion mixture of the weak gel composition, a lower molecular weight polyethylene and a high molecular weight polyethylene, heating the dispersion mixture in the container between about 240° F. and 450° F. to obtain a homogeneous mixture thereof, inserting the ball into the container so that the homogeneous mixture covers the surface of the ball or any desired portion thereof, and cooling the homogeneous mixture to sufficient temperature to solidify the mixture, thereby forming a rigid and strong socket around the ball to produce the ball joint which is easily removable from the container. The ball joint thus produced is self-lubricating for the life thereof and has a strength sufficient to be used as the socket of the ball joint for any conventional application thereof.

Another extremely important property of the composition of this invention is that the rigid gel composition is capable of being molded by reciprocating screw injection machines of the types which are used for molding thermoset resins. As is well-known, for certain applications, these types of molding machines have inherent advantages over other types of molding machines. Whereas it is impractical, if not impossible, to mold high molecular weight polyethylene in the aforementioned reciprocating screw injection machines, the rigid gel compositions of this invention have properties which enable the composition to be molded very conveniently into a variety of shapes by said machines.

It should be understood that various additives normally used in lubricants can be added to the composition of this invention. Other additives, such as pigments and dyes, could also be used. However, we have found that the addition of a small amount of a suitable finely divided filler to the rigid composition of this invention, minimizes any possible dimensional instability, such as shrinkage, of the composition. The finely divided fillers should have a particle size within the range of about −50 to about −325 U.S. mesh and should have a relatively low coefficient of friction and be nonabrasive to the material or article which is being lubricated. Exemplary of such fillers are molybdenum disulfide; nylon powder, the preparation of which is described in U.S. Patents 2,639,278 and 3,022,542; Lexan which is the trademark of General Electric Company for a polyaryl carbonate; and Delrin which is the trademark of du Pont de Nemours and Company for a polyacetal. The amount of the finely divided filler can vary over a wide range, and should be sufficient to produce the desired result; however, it is preferred to use between about 1% to about 20% of the filler.

As mentioned above, the high molecular weight polyethylene component of this invention has a molecular weight within the range of from over $1 \times 10^6$ to about $5.0 \times 10^6$. Although the molecular weight range of the polyethylene is from over $1.0 \times 10^6$ to about $5.0 \times 10^6$, a molecular weight range of from about $1.5 \times 10^6$ to about $3.5 \times 10^6$ is preferred.

Examples of high molecular weight polyethylenes are: a polyethylene produced by Allied Chemical Co. under the trade designation AC-3X, which has a particle size of about 40 mesh and a molecular weight of about $3 \times 10^6$; a polyethylene produced by Allied Chemical Co. under the trade designation AC-1221, which has a melt index of 0.00, particle size of less than 100 mesh screen and an average molecular weight of from about $1.5 \times 10^6$ to about $2.5 \times 10^6$; and a polyethylene produced by Hercules Powder Company under the trade name Hi-Fax 1900, which has an average molecular weight of over $2 \times 10^6$ and a melt index of 0.01.

The melt index of the high molecular weight polyethylene is between 0.00 and less than about 0.1 as measured by ASTM D-1238-62T.

The high molecular weight polyethylenes can be produced by any conventional method. One method of producing the high molecular weight polyethylene is by a process using Ziegler catalysts as described in a book entitled "Polyethylene" by R. A. V. Raff and J. B. Allison, 1956, p. 78.

Examples of the lower molecular weight polyethylenes are: a polyethylene produced by Allied Chemical Company under the trade designation of AC-6A, which has an average molecular weight of 2000, specific gravity of 0.92, a viscosity of 180 cps. at 284° F., and a melting point of 219–226° F.; a polyethylene produced by Allied Chemical Company under the trade designation of AC-615, which has a molecular weight of 5,000, specific gravity of 0.92, a viscosity of 4000 cps. at 284° F., and a melting point of 224–232° F.; a polyethylene produced by Allied Chemical Company under the trade designation of AC-617, which has a molecular weight of 1500, specific gravity of 0.91, a viscosity of 100 cps. at 284° F., and a melting point of 210–217° F.; a polyethylene produced by Eastman Chemical Company under the trade name Tenite, which has a melt index of 7, a specific gravity of 0.92, and a molecular weight at 23,000; and a polyethylene produced by U.S.I. Chemical Company under the trade name of Microthene (MN-718), which has a melt index of 22, a specific gravity of 0.915, and an average particle size of less than 20 microns. The lower molecular weight polyethylenes can be produced by different conventional methods which are well known in the art.

The lubricant employed in the practice of this invention can be any hydrocarbon oil which has a lubricating viscosity. Excellent results have been obtained when the oil utilized is a mineral oil; and mineral oils are the preferred oil component. The mineral oil may be a solvent-extracted or a solvent-refined oil. Exemplary of the hydrocarbon mineral oils are: Harmony oil #44 (SAE #10) produced by Gulf Refinery Co., which is a pure hydrocarbon oil containing an antifoam additive, rust and oxidation inhibitors, and has a viscosity of 150.2 SUS at 100° F.; Insulating oil #10-C produced by General Electric Corporation; Sunoco 280 (SAE #20) produced by Sun Oil Co., which has a viscosity of 250–280 SUS at 100° F. and a specific gravity of 0.87–0.88; Gulf SAE 10 which is a regular motor oil and is produced by Gulf Oil Co.; Security #71 (SAE #40) produced by Gulf Oil Co., which is a pure hydrocarbon oil containing no additives and has a viscosity of 610 SUS at 100° F.; Security #53 (SAE #20) produced by Gulf Oil Co., which is a pure hydrocarbon oil containing no additives and has a viscosity of 305 SUS at 100° F.; Kendall oil 10W which is a regular motor oil; Shell oil #66602, bearing infusion oil, produced by Shell Oil Co.; Harmony oil #41 (SAE less than #20) produced by Gulf Oil Co., which is a pure hydrocarbon oil containing additives, antifoam, rust and oxidation inhibitors, and has a viscosity of 105 SUS at 100° F.; and Esso's Ultragear oil, SAE #90.

Although the hydrocarbon mineral oils are by far the preferred lubricant component, other hydrocarbon oils, including vegetable and animal oils, of lubricating viscosity can be also used. In addition, various of the synthetic oils comprising hydrocarbon groups can be utilized.

The high molecular weight polyethylene component of the composition of this invention is insoluble in such typical organic solvents as benzene, toluene and Decalin. Its solubility properties—or more aptly its insolubility properties—are thus quite different from the solubility properties of substantially lower molecular weight polyethylenes which are soluble in one or more of the aforementioned organic solvents and which are known to form solutions—as opposed to gels—when combined with oil. Solubility tests performed with polyethylenes of molecular weight within the range of about 1.5–2.5 million (Allied Chemical Co. AC-1221) have shown that it is insoluble at room temperature in benzene, toluene and Decalin and also that it is insoluble in these organic solvents at their boiling point temperatures which are 176° F., 230° F., and 377° F., respectively.

During the solubility testing, it was observed that the above described high molecular weight polyethylene swelled in benzene at 176° F.; and that in toluene at 230° F. and in Decalin at 377° F., there were obtained gelatinous mixtures. Upon cooling each of the hot gelatinous mixtures, it was observed that some of the toluene and Decalin separated from its corresponding gelatinous mixture.

As illustrative of the jelly-like gel compositions of this invention which can be processed to a grease-like consistency, three compositions were made up and their oil separation properties were tested in accordance with a standard grease test, namely ASTM D-1742. The results of this test are reported in Table 1 below.

Another test was also utilized to evaluate the oil separation and dispensing properties of the compositions. This other test involved placing a 10 gram sample of the composition on the top sheet of a pack of 25 sheets of filter paper that were stapled together and previously weighed. The sample composition was allowed to remain on the filter paper for 100 hours at room temperature, after which time it was removed and the pack of filter paper was reweighed to determine the amount of oil that was absorbed by the paper from the composition. The same test was utilized to determine the oil separation or dispensing properties of a sample composition maintained at a temperature of 200° F. The results of the tests are reported in Table I below as "Percent Wt. Loss of Composition," which indicates the percent of oil that was absorbed by the filter paper. The identification of the filter paper is #5 (Whatman filter papers) and it was 7.0 centimeters in diameter.

The components comprising the compositions which were subjected to the tests described above were a hydrocarbon mineral oil (Sunvis 941—Sun Oil Co.), a polyethylene of molecular weight 1.5–2.5 million (AC 1221—Allied Chemical Co.) and a polyethylene of molecular weight 23,000 (Eastman Chemical Co. Tenite 808). The compositions are identified in Table 1 below as Examples 1, 2 and 3. For comparative purposes there is also set forth in Table 1 below Examples 1a, 2a and 3a, which compositions were subjected to the same tests and which were comprised of the same oil component and the same high molecular weight component as Examples 1, 2 and 3, but which did not contain the lower molecular weight polyethylene.

Each of the compositions reported in Table 1 was made according to the same method. This method include heating a mixture of the oil and polyethylene components in a container to a temperature of 320° F. to 350° F. and maintaining the composition within this temperature range for about 3 minutes. The mixture was agitated continuously during the heating cycle. The composition was then poured into trays and allowed to cool to room temperature. After the material was cooled it was passed through a meat grinder having a small mesh screen. Thereafter the compositions were tested according to the tests described hereinabove.

TABLE 1

| Ex. No. | Components of composition, wt. percent | | | Tests | | |
|---|---|---|---|---|---|---|
| | Oil | Polyethylene, mol. wt. | | Oil separation test, ASTM D-1742 | Oil dispensing test, percent weight loss of comp. | |
| | | 23,000 | 1.5, 2.5, mil. | | 75° F., 100 hrs. | 200° F., 100 hrs. |
| 1 | 96 | 3 | 1 | 7.5 | 48.70 | 71.6 |
| 1a | 99 | | 1 | 16.8 | 80.13 | 75.85 |
| 2 | 94 | 3 | 3 | 2.7 | 33.60 | 42.6 |
| 2a | 97 | | 3 | 9.7 | 52.97 | 55.5 |
| 3 | 92 | 3 | 5 | 0 | 17.30 | 32.23 |
| 3a | 95 | | 5 | 6.9 | 42.17 | 45.8 |

The extent to which the addition of a low molecular weight polyethylene to a composition comprising oil and a high molecular weight polyethylene reduces the separation of oil from the composition is illustrated strikingly in the test results reported in Table 1 above. By way of further explanation, it is pointed out that the oil separation properties of the composition of Example 1 were 55.4% lower than of 1a, 72.3% lower for the composition of Example 2 than of 2a and 100% lower for the composition of Example 3 than of 3a. In comparing the compositions that were tested on the filter paper it is noted that at 75° F. the oil dispensing properties of the composition of Example 1 was 38.6% lower than 1a, the composition of Example 2 was 36.6% lower than 2a, and the composition of Example 3 was 59% lower than 3a; and at 200° F. the corresponding percentages are 5.6%, 23% and 29.7%, respectively.

The significance of the differences in the oil separation properties of the compositions set forth in Table 1 above is that the compositions of Examples 1–3 would have a much longer lubricating life than the compositions of 1a, 2a and 3a, respectively.

In another comparative test, sample compositions of Examples 3 and 3a (prepared in the same way as the compositions of Examples 3 and 3a) were subjected to ASTM D–217 to determine their penetration properties. There was obtained a test value of 197 for the composition of Example 3 and a test value of 255 for the composition of Example 3a. These test results show the striking improvement in penetration properties that is realized by utilizing the mixture of high and lower molecular weight polyethylenes in the oil.

The following examples are additional illustrations of the jelly-like gel compositions of this invention.

EXAMPLE 4

6.5 grams of a polyethylene having a molecular weight of 23,000 were mixed with 91.5 grams of Gulf SAE #10 motor oil in a beaker and heated to 180° F. The viscosity of the mixture was about the same as that of the oil. This mixture was then cooled to room temperature and 2 grams of a polyethylene of an average molecular weight of $1.5 \times 10^6$ to $2.5 \times 10^6$ were mixed with it to form a dispersion of the polyethylenes and the oil. The dispersion was then slowly heated and stirred in the beaker to 300° F. After about 3 minutes a homogeneous mixture was formed which was cooled to form a jelly-like, oil-retaining, homogeneous gel.

EXAMPLE 5

91.5 grams of Gulf SAE #10 regular motor oil, 6.5 grams of a polyethylene having a molecular weight of 23,000, and 2.0 grams of a polyethylene having an average molecular weight of $1.5 \times 10^6$ to $2.5 \times 10^6$ were thoroughly mixed. Of this mixture 60 lbs./hour were passed through an extruder (1.5 inch Thermatic extruder) having a screw diameter of 1.5 inches and a barrel temperature of 270° F. and a nozzle temperature of 350° F. The product was similar to that of Example 4 at room temperature.

EXAMPLE 6

91.5 grams of Security #53 (SAE #20 oil), a pure hydrocarbon oil containing no additives, 6.5 grams of a polyethylene having a molecular weight of 23,000, and 2.0 grams of a polyethylene having an average molecular weight of $1.5 \times 10^6$ to $2.5 \times 10^6$ were thoroughly mixed and 20 lbs./hour of this mixture were passed through a 1.5 inch Thermatic extruder with a barrel temperature of 400° F. and a nozzle temperature of 350° F. The product was similar to that of Example 4 at room temperature.

EXAMPLE 7

92 grams of Sunoco #280 (SAE #20 oil), a petroleum oil containing additives and inhibitors, 4 grams of a polyethylene having a molecular weight of 23,000 and 4 grams of a polyethylene having an average molecular weight of $1.5 \times 10^6$ to $2.5 \times 10^6$ were thoroughly mixed. Of this mixture 20 lbs./hour were passed through the same extruder as in Example 5. At room temperature, the product was similar to that of Example 4 except that it was more cohesive and a stronger gel.

EXAMPLE 8

The procedure of Example 7 was followed except that the oil used was Shell oil #66602, a bearing infusion oil. The product was similar to that of Example 7.

EXAMPLE 9

94.50 grams of the petroleum oil used in Example 7, 2.75 grams of a polyethylene having a molecular weight of 23,000, and 2.75 grams of a polyethylene having an average molecular weight of $1.5 \times 10^6$ to $2.5 \times 10^6$ were mixed and then passed through a heat exchanger (Votator) at 17–19 p.s.i. and at a temperature of 300–330° F. The product was a thick, cohesive liquid and upon cooling it became a homogeneous jelly-like product. This jelly-like product was passed through an ordinary meat grinder. The result was a smooth, grease-like gel.

EXAMPLE 10

96 grams of the petroleum oil used in Example 7, 2.0 grams of a polyethylene having an average molecular weight of $1.5 \times 10^6$ to $2.5 \times 10^6$ and 2.0 grams of polyethylene having a molecular weight of 23,000 were mixed and slowly heated to 300° F. At 300° F. the mixing process continued for one hour. The hot mixture was then poured into a container and cooled to room temperature.

The result was a stable, oil-retaining, and rather smooth-looking jelly-like product.

EXAMPLE 10a

The procedure of Example 10 was followed except that the lower molecular weight polyethylene was omitted. The product was similar to that of Example 10 except that its oil-retaining characteristic was not as good as that obtained in Example 10.

The next group of examples are illustrative of the rigid-like gel compositions of this invention.

EXAMPLE 11

71.7 grams of Harmony oil #44 (SAE #10) and 0.7 gram of a polyethylene having a molecular weight of 23,000 were thoroughly mixed and heated until the polyethylene was dissolved in the oil. The mixture was cooled to room temperature and 27.6 grams of polyethylene having a molecular weight of $1.5 \times 10^6$ to $2.5 \times 10^6$ were added to and mixed thoroughly therewith. The result was a creamy, pourable and thick dispersion mixture.

A ball bearing was dipped into some SAE #40 oil and then placed in a container and preheated for 15 minutes at 300° F. in an oven. The bearing was then removed from the oven and the space between its inner and outer rings was filled with the dispersion mixture which embodied the balls. The bearing was then returned to the oven for 45 minutes at 300° F. The bearing was cooled to about 200° F., the dispersion mixture solidified to a rigid gel and the balls therein were completely free to rotate. The bearing was self-lubricating and the rigid gel in the bearing was oil-retaining.

EXAMPLE 12

75 grams of SAE #40 oil, 0.375 grams of a polyethylene having a molecular weight of 23,000, 0.375 gram of a polyethylene having a molecular weight of $1.5 \times 10^6$ to $2.5 \times 10^6$ and 8 grams of a dried nylon powder were mixed and heated to 300° F. while agitating the mixture. The heated mixture was cooled to about 200° F. and formed a fluid, weak gel product. At room temperature, 12 grams of the $1.5 \times 10^6$ to $2.5 \times 10^6$ molecular weight polyethylene were added to the fluid product and mixed thoroughly. This produced a dispersion mixture of the product and the polyethylene. A ball bearing was dipped into some SAE #40 oil and then placed in a container and preheated for 15 minutes at 300° F. in an oven. The bearing was removed from the oven and the space between its inner and outer rings was filled with the dispersion mixture which embodied the balls. The bearing was returned to the oven for 45 minutes at 300° F. After cooling to about 200° F., the dispersion mixture had solidified and the balls therein were completely free to rotate. The bearing was self-lubricating and the solidified mixture therein was oil-retaining. After 6 months there was no shrinkage of the mixture in the bearing.

EXAMPLE 13

81.7 grams of Harmony oil #44 (SAE #10) and 1.5 grams of a polyethylene having a molecular weight of 23,000 were mixed while heating to 200° F. The mixture was cooled to room temperature. To this cooled mixture, 8.4 grams of a nylon powder, and 8.4 grams of polyethylene having an average molecular weight of $1.5 \times 10^6$ to $2.5 \times 10^6$ were added and mixed thoroughly and heated to 350° F. for 15 minutes and then cooled slowly to room temperature. The product was a tough, strong solid. The product was left set for 6 months and the oil was still well retained therein.

EXAMPLE 14

99 grams of Security oil #53 (SAE #20), 0.5 gram of a polyethylene having a molecular weight of $1.5 \times 10^6$ to $2.5 \times 10^6$, and 0.5 gram of polyethylene having a molecular weight of 23,000 were mixed and heated. Upon cooling, the mixture formed a gel. There were mixed 75 grams of this gel with 12 grams of a polyethylene having a molecular weight of $1.5 \times 10^6$ to $2.5 \times 10^6$ and 13 grams of a nylon powder. The mixture was poured into a mold and then heated at 325° F. for 30 minutes. Upon cooling, the product was a tough, rigid gel.

EXAMPLE 15

99 grams of Harmony oil #44 (SAE #10), 0.5 gram of a polyethylene having a molecular weight of $1.5 \times 10^6$ to $2.5 \times 10^6$ and 0.5 gram of polyethylene having a molecular weight of 23,000 were mixed and heated to 300° F. Of the heated mixture 77.8 grams were cooled to room temperature and mixed with 13.4 grams of the polyethylene having a molecular weight of $1.5 \times 10^6$ to $2.5 \times 10^6$, and 8.8 grams of a nylon powder. A dispersion mixture was obtained which was mixed thoroughly, poured into a mold and then heated to 300° F. for 60 minutes. Upon cooling, a rigid, homogeneous gel composition was produced in the shape of the mold which had no shrinkage after 6 months.

The next group of examples are illustrative of the liquid-like gel compositions of this invention.

EXAMPLE 16

Five quarts of SAE #20 oil containing 0.25% of a polyethylene having a molecular weight of 23,000 and 0.25% of a polyethylene having an average molecular weight of $1.5 \times 10^6$ to $2.5 \times 10^6$ were mixed and heated to 300° F. to form a homogeneous low viscosity gel. Upon cooling to 200° F., the gel became more viscous and was a homogeneous fluid gel. This product was used as a motor oil and placed into the engine crankcase of an old, worn-out 1957 Mercury automobile. The combustion efficiency of the automobile increased 50% and its oil consumption decreased by a factor of 10. When the product was used as a motor oil additive in an automobile, the combustion efficiency increased and its oil consumption decreased.

EXAMPLE 17

A composition comprising 0.25% of polyethylene of molecular weight 23,000 (Eastman Chemical Company—Tenite 808), 0.25% of polyethylene of molecular weight of 1.5–2.5 million (AC 1221—Allied Chemical Company) and 99.5% hydrocarbon mineral oil (Sunvis 941—Sun Oil Co.) was prepared by heating a mixture of the polyethylene and components to 320° F. to 350° F. and maintaining the composition within this temperature range for about three minutes. The mixture was agitated continuously during the heating cycle. The composition was then cooled and blended with a wire beater at No. 8 speed for 10 minutes (a Kitchen Aid mixer Model K-A was used). There was obtained a liquid gel which had a viscosity of 650 cps. at 75° F.

We claim:
1. A composition consisting essentially of:
   (a) about 9.75 to about 94.75% by weight of hydrocarbon oil of lubricating viscosity;
   (b) greater than about 5 to about 90% by weight of high molecular weight polyethylene having an average molecular weight within the range of about 1.5 million to about 5 million; and
   (c) about 0.25 to about 40% by wt. of a lower molecular weight polyethylene having an average molecular weight within the range of about 1,000 to and including 1,000,000;
wherein said composition is a firm, tough, solid gel having an oily surface as a result of oil exuding from said composition.

2. A composition according to claim 1 wherein the amount of high molecular weight polyethylene in the composition is about 8 to about 40% by wt. of the composition.

3. A composition according to claim 2 wherein the molecular weight of said lower molecular weight polyethylene is within the range of about 1,000 to about 100,000.

4. A composition according to claim 2 wherein the molecular weight of said lower molecular weight polyethylene is within the range of about 20,000 to about 50,000.

5. A composition according to claim 1 wherein the amount of high molecular weight polyethylene in the composition is about 25 to about 85% by wt. of the composition.

6. A composition according to claim 5 wherein the molecular weight of said lower molecular weight polyethylene is within the range of about 1,000 to about 100,000.

7. A composition according to claim 5 wherein the molecular weight of said lower molecular weight polyethylene is within the range of about 20,000 to about 50,000.

8. A composition consisting essentially of:
 (a) about 9.75 to about 94.75% by weight of mineral oil of lubricating viscosity;
 (b) greater than about 5 to about 90% by weight of high molecular weight polyethylene having an average molecular weight within the range of about 1.5 million to about 5 million; and
 (c) about 0.25 to about 40% by wt. of a lower molecular weight polyethylene having an average molecular weight within the range of about 1,000 to about 100,000;
wherein said composition is a firm, tough, solid gel having an oily surface as a result of oil exuding from said composition.

9. An article comprising the composition of claim 8, said article having an oily surface as a result of oil exuding from said composition.

10. A composition according to claim 8 wherein the molecular weight of said high molecular weight polyethylene is within the range of about 1.5 million to about 3.5 million.

11. A composition according to claim 10 wherein the amount of said high molecular weight polyethylene in the composition is about 8 to about 40% by weight of the composition.

12. An article comprising the composition of claim 11, said article having an oily surface as a result of oil exuding from said composition.

13. A composition according to claim 10 wherein the amount of said high molecular weight polyethylene in the composition is about 25 to about 85% by weight of the composition 14. An article comprising the composition of claim 13, said article having an oily surface as a result of oil exuding from said composition.

15. A composition consisting essentially of:
 (a) about 9.75 to about 94.75% by weight of mineral oil of lubricating viscosity;
 (b) greater than about 5 to about 90% by weight of high molecular weight polyethylene having an average molecular weight within the range of about 1.5 million to about 5 million; and
 (c) about 0.25 to about 40% by wt. of a lower molecular weight polyethylene having an average molecular weight within the range of about 20,000 to about 50,000;
wherein said composition is a firm, tough, solid gel having an oily surface as a result of oil exuding from said composition.

16. An article comprising the composition of claim 15, said article having an oily surface as a result of oil exuding from said composition.

17. A composition according to claim 15 wherein the molecular weight of said high molecular weight polyethylene is within the range of about 1.5 million to about 3.5 million.

18. A composition according to claim 17 wherein the amount of said high molecular weight polyethylene in the composition is about 8 to about 40% by weight of the composition.

19. An article comprising the composition of claim 18, said article having an oily surface as a result of oil exuding from said composition.

20. A composition according to claim 17 wherein the amount of said high molecular weight polyethylene in the composition is about 25 to about 85% by weight of the composition.

21. An article comprising the composition of claim 20, said article having an oily surface as a result of oil exuding from said composition.

References Cited

UNITED STATES PATENTS

| | | | |
|---|---|---|---|
| 2,246,092 | 6/1941 | Gilman | 252—12.2 X |
| 2,691,647 | 10/1954 | Field et al. | 252—59 X |
| 2,810,695 | 10/1957 | Young et al. | 252—59 X |
| 2,917,458 | 12/1959 | Morway et al. | 252—32 |
| 3,112,270 | 11/1963 | Mitacek et al. | 252—59 X |
| 3,112,297 | 11/1963 | Gordon et al. | 252—59 X |
| 3,114,708 | 12/1963 | Morway et al. | 252—12 |
| 3,169,114 | 2/1965 | Mitacek et al. | 252—59 |

FOREIGN PATENTS

| | | |
|---|---|---|
| 698,611 | 10/1953 | Great Britain. |
| 632,895 | 12/1961 | Canada. |

OTHER REFERENCES

Kirk-Othmer: "Encyl. Chem. Technol," 2nd ed., vol. 14 (1967), p. 244.

PATRICK P. GARVIN, Primary Examiner

W. H. CANNON, Assistant Examiner

U.S. Cl. X.R.

252—12.2, 12.4, 12.6, 14, 59; 260—33.6; 308—240